O. A. COLBY.
TEMPERATURE CONTROLLING SYSTEM.
APPLICATION FILED AUG. 18, 1921.

1,438,635.
Patented Dec. 12, 1922.

WITNESSES:

INVENTOR
Ora A. Colby.
BY
ATTORNEY

Patented Dec. 12, 1922.

1,438,635

UNITED STATES PATENT OFFICE.

ORA A. COLBY, OF IRWIN, PENNSYLVANIA, ASSIGNOR TO WESTINGHOUSE ELECTRIC AND MANUFACTURING COMPANY, A CORPORATION OF PENNSYLVANIA.

TEMPERATURE-CONTROLLING SYSTEM.

Application filed August 18, 1921. Serial No. 493,256.

*To all whom it may concern:*

Be it known that I, ORA A. COLBY, a citizen of the United States, and a resident of Irwin, in the county of Westmoreland and State of Pennsylvania, have invented a new and useful Improvement in Temperature-Controlling Systems, of which the following is a specification.

My invention relates to temperature-controlling systems and particularly to systems for maintaining substantially constant temperatures in furnaces or other heat-storage devices.

One object of my invention is to provide a system for controlling two heating elements whereby the elements may be connected in parallel relation to a source of energy while the temperature of the device to be heated is below a predetermined value, and whereby elements may be connected in series with the source of energy, when a predetermined temperature is attained, to limit the heating of the heat-storage device.

Another object of my invention is to provide a control system whereby a single switching device shall be controlled in accordance with the temperature of the heat-storage device to effect parallel or series connections between the heating elements and the source of energy.

In practicing my invention, I provide a switching device for controlling the connections of one of the heating elements whereby it may be connected either in series, or in parallel, with the other heating element. I employ also a motor-operated snap switch and a thermal-responsive member that is controlled in accordance with the temperature of the heat-storage device for controlling the switching device mentioned above.

The motor-operated snap switch that I employ comprises the subject matter of a co-pending application, Serial No. 328,033, filed Oct. 2, 1919, by R. A. Bolze and E. W. Denman, and assigned to the Westinghouse Electric and Manufacturing Company.

Figure 1:
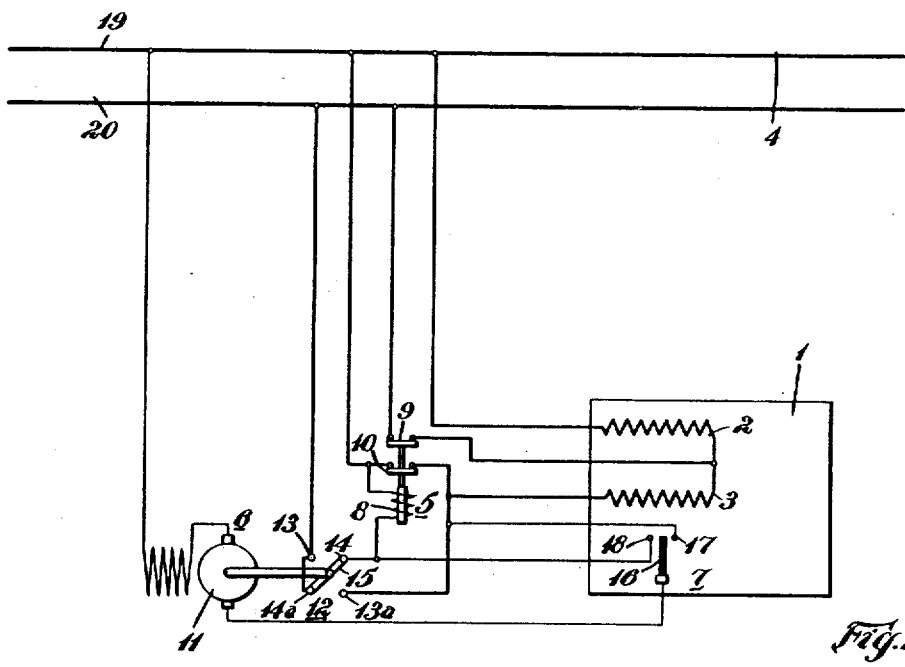
Figure 1 is a diagrammatic view of an electrical circuit including a control system embodying my invention.

A furnace or heat-storage device 1 is provided with two heating elements 2 and 3 that are supplied with energy from a source 4 of electromotive force to heat the furnace 1.

The circuit connections of the heating elements are controlled by a contactor switch 5, the actuation of which is controlled by a motor-operated snap-switch 6 and a thermostat 7 that is subjected to the temperature within the furnace 1. The contactor switch 5 comprises an operating coil 8 and two switches 9 and 10.

The motor-operated snap switch 6 comprises a motor 11 and a snap-switch 12 that is controlled thereby to complete a circuit between corresponding contact members 13, and 13a, and 14 and 14a, by a bridging member 15.

The thermostat 7 comprises a thermal-responsive element, such as a bimetallic element 16, that is adapted to engage a contact member 17 when the temperature within the furnace 1 attains a predetermined minimum value, and that is adapted to engage a contact member 18 when the temperature attains a predetermined maximum value.

Assuming that the circuit 4 is energized to supply energy to the heating elements 2 and 3, and that the temperature of the furnace is less than the predetermined minimum value, engagement will be effected between the bimetallic element 16 and the contact member 17.

Upon the energization of the circuit 4 to supply energy to the heating elements 2 and 3, a circuit is completed from the conductor 19 of the circuit 4 through the operating coil 8 of the contactor switch 5 and the contact members 14 and 14a, and the bridging member 15, to the conductor 20 of the circuit 4.

The contactor switch 5 is actuated to close the switches 9 and 10, whereupon the heating elements 2 and 3 are connected to the energizing circuit 4 in parallel relation.

The furnace 1 gradually becomes heated and, when the temperature therein attains a predetermined maximum value, the bimetallic member 16 engages the contact member 18. A circuit is thereupon completed from the conductor 19, through the motor 11, the bimetallic member 16 and contact member 18 of the thermostat 7, contact members 14 and 14a and the bridging member 15 of the snap-switch 12, to the conductor 20 of the circuit 4.

The switch 12 is thereupon actuated to its other position by the motor to cause the bridging member 15 to engage the contact members 13 and 13a and to open the circuit between the contact members 14 and 14a.

Upon the opening of a circuit between the contact members 14 and 14a, the operating coil 8 of the switch 5 is de-energized and the switches 9 and 10 are opened. Completion of the circuit between the contact members 13 and 13a, however, serves to connect the heating element 3 to the conductor 20 of the circuit 4 in series with the heating element 2.

The heat that is developed in the heating elements 2 and 3 when they are connected in series is less than when these elements are connected in parallel relation to the circuit 4, and, when the heat that is stored in the furnace 1 is removed, by reason of the removal of such devices as have been heated therein, the temperature decreases to the value at which the bimetallic member 16 re-engages the contact member 17.

When the bimetallic member 16 engages the contact member 17, a circuit is completed from the conductor 19 of the circuit 4 through the motor 11, the bimetallic member 16 and the contact member 17, the contact members 13 and 13a and the bridging member 15 of the switch 12 to the conductor 20 of the circuit 4. The motor 11 thereupon actuates the switch to its initial position at which the conductors 14 and 14a are bridged and the circuit is completed for re-energizing the operating coil 8. The same cycle of operation ensues in accordance with the temperature obtaining in the furnace 1.

Figure 2:
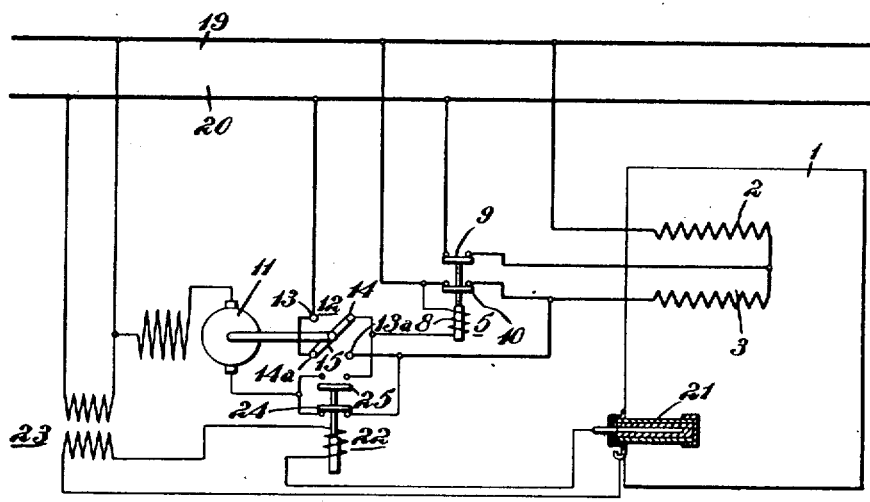
Fig. 2 is a diagrammatic view of a similar circuit embodying a modified form of temperature-controlling device.

In Fig. 2 of the accompanying drawings is illustrated a modified system for the control of the furnace in which the operating temperatures may exceed the value at which a bimetallic member will operate satisfactorily. For the control of a furnace that operates at a relatively high temperature, I employ a thermostat comprising a metallic salt that fuses and becomes conducting at a predetermined relatively high temperature.

For the control of such furnace, I employ various elements that are illustrated in Fig. 1, and also a thermostat 21, a relay 22 and a relatively small transformer of the bell-ringing type for controlling the actuation of the relay 22 in accordance with the temperature of the furnace 1.

The operation of the system that is illustrated in Fig. 2 corresponds to the operation described above for the system that is illustrated in Fig. 1, except for the manner of controlling the motor by means of the thermostat.

When the temperature of the furnace is below a predetermined value, the relay 22 is in the position that is illustrated, at which position the switch 24 is closed and the switch 25 is open. When the circuit 4 is energized to supply energy to the heating elements 2 and 3, the switch 5 is actuated, as described above, to connect the heating element 3 to the circuit 4.

When the temperature of the furnace 1 increases to a predetermined maximum value, the salt contained within the thermostat 21 fuses and becomes conducting, whereupon the relay 22 is actuated to open the switch 24 and to close the switch 25.

The closing of the switch 25 completes a circuit from the conductor 19 through the motor 11, the contact members 14 and 14a and the bridging member 15 of the snap switch 12, to the conductor 20. The switch 12 is thereupon actuated to its other position to engage the contact members 13 and 13a and to open the circuit between the contact members 14 and 14a.

The actuation of the snap switch 12 de-energizes the circuit of the coil 8, whereupon the switch 5 opens to disconnect the heating element 3 from the conductor 19. As illustrated above, the actuation of the switch 12 to complete the circuit between the contact members 13 and 13a serves to connect the heating element 3 to the conductor 20.

When the temperature within the furnace decreases to a predetermined minimum value at which the fused salt within the thermostat re-solidifies and becomes relatively non-conducting, the operating coil of the relay 20 becomes de-energized and, consequently, the switch 25 is opened and the switch 24 reclosed.

The reclosing of the switch 24 completes a circuit through the contact members 13 and 13a of the snap-switch, which re-energizes the motor to cause the same to actuate the switch to its initial position, as illustrated, to engage the contact members 14 and 14a.

The switch 5 is thereupon actuated to re-connect the heating elements 2 and 3 in parallel relation to the circuit 4 to increase the heating in the furnace 1. The same cycle of operation ensues in accordance with the temperature obtaining within the furnace.

Figure 3:
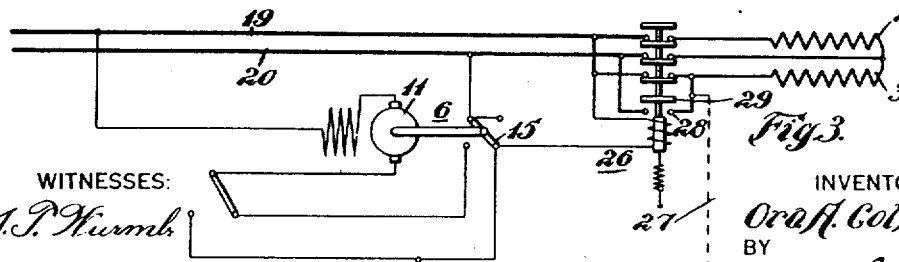
Fig. 3 is a diagrammatic view of a modification of the circuit illustrated in Fig. 1.

In Fig. 3 is illustrated a modification of the circuit that is shown in Fig. 1. The connections of the heating elements 2 and 3 are controlled by a switch 26. By employing the connection illustrated by the conductor 27 shown in broken lines, the contact members 28 and the bridging member 29 may be eliminated.

My invention is not limited to the specific arrangement of the apparatus that is illustrated, since modifications may be made therein within the spirit and scope of the invention, as set forth in the appended claims.

I claim as my invention:—

1. A control circuit for maintaining the temperature of a heat-storage device constant comprising a plurality of heating elements, a source of energy therefor, a switch for connecting the heating elements in parallel relation to the source of energy, a motor-operated snap switch for controlling the connecting switch and for connecting the heating elements in series relation to the source of energy, and means responsive to the temperature of the heat-storage device for controlling the motor-operated snap switch.

2. A control circuit for maintaining the temperature of a heat-storage device constant comprising a plurality of heating elements, a source of energy therefor, a switch for connecting the heating elements in parallel relation to the source of energy, and a second switch controlled in accordance with the temperature of the heat-storage device for controlling the aforesaid switch and for connecting the heating elements in series with the source of energy.

3. A control circuit for maintaining the temperature of a heat-storage device constant comprising a plurality of heating elements, a source of energy therefor, a switch for connecting the heating elements in parallel relation to the source of energy, a second switch for connecting the heating elements in series with the source of energy and for rendering the aforesaid switch ineffective, and means responsive to the temperature of the heat-storage device for controlling the actuation of the second switch.

4. A control circuit for maintaining the temperature of a heat-storage device constant comprising a plurality of heating elements, a source of energy therefor, a switch for connecting the heating elements in parallel relation to the source of energy, and means including a device responsive to the temperature of the heat-storage device for rendering the said connecting switch ineffective and for effecting the connection of the heating elements in series relation to the source of energy.

5. A control circuit for maintaining the temperature of a heat-storage device constant comprising a plurality of heating elements, a source of energy therefor, a switch for connecting the heating elements in parallel relation to the source of energy, a double-throw switch operative in one position to render the aforesaid connecting switch effective and operative in the other position to connect the heating elements in series to the source of energy and means responsive to the temperature of the heat-storage device for controlling the double-throw switch.

6. A control circuit for maintaining the temperature of a heat-storage device constant comprising a plurality of heating elements, a source of energy therefor, and switch means for connecting the heating elements in parallel relation to the source of energy while in one position and connecting the elements in series with the source of energy while in another position.

7. A control circuit for maintaining the temperature of a heat-storage device constant comprising a plurality of heating elements, a source of energy therefor, and switch means for connecting the heating elements in parallel relation to the source of energy while in one position and connecting the elements in series with the source of energy while in another position, and means responsive to the temperature of the heat-storage device for controlling the disposition of the switching means.

8. A control circuit for maintaining the temperature of a heat-storage device constant comprising a plurality of heating elements, a source of energy therefor, and means connected to the terminals of one heating element for controlling the disposition thereof in parallel or series relation with respect to the other element and the source of energy.

9. A control circuit for maintaining the temperature of a heat-storage device constant comprising a plurality of heating elements, a source of energy therefor, means for joining one terminal of each element, means for connecting the free terminal of one element to one terminal of the source of energy, and means operative under one condition to connect the free terminal of the other element to the aforesaid terminal of the source of energy and the junction of the two elements to the other terminal of the source of energy and operative under another condition to connect the free end of the latter heating element to the latter terminal of the source of energy.

In testimony whereof, I have hereunto subscribed my name this first day of August, 1921.

ORA A. COLBY.